(12) United States Patent
Tian et al.

(10) Patent No.: US 6,868,215 B2
(45) Date of Patent: Mar. 15, 2005

(54) DYE THIN FILM, PRODUCTION METHOD THEREOF, OPTICAL SWITCH, OPTICAL DISTRIBUTOR, OPTICAL MODULATOR AND OPTICAL SWITCH ARRAY

(75) Inventors: Minquan Tian, Nakai-machi (JP); Makoto Furuki, Nakai-machi (JP); Satoshi Tatsuura, Nakai-machi (JP); Yasuhiro Sato, Nakai-machi (JP); Izumi Iwasa, Nakai-machi (JP); Lyong Sun Pu, Suwon (KR)

(73) Assignee: Fuji Xerox Co., Ltd., Tokyo (JP)

( * ) Notice: Subject to any disclaimer, the term of this patent is extended or adjusted under 35 U.S.C. 154(b) by 117 days.

(21) Appl. No.: 10/422,740

(22) Filed: Apr. 25, 2003

(65) Prior Publication Data

US 2004/0001666 A1 Jan. 1, 2004

(30) Foreign Application Priority Data

Apr. 26, 2002 (JP) ........................... 2002-125772

(51) Int. Cl.[7] ................................. G02B 6/10
(52) U.S. Cl. ..................... 385/130; 385/16; 385/18; 549/304; 549/305; 549/307; 359/321
(58) Field of Search ..................... 385/16, 18, 130; 549/141, 304, 305, 307; 359/321

(56) References Cited

U.S. PATENT DOCUMENTS

2003/0031439 A1 * 2/2003 Iwasa et al. ............... 385/122
2003/0220511 A1 * 11/2003 Tian et al. .................. 549/309

FOREIGN PATENT DOCUMENTS

| JP | A 11-282034 | 10/1999 | ............ 385/141 X |
| JP | A 2000-111967 | 4/2000 | ................ 385/141 |

OTHER PUBLICATIONS

Furuki et. al., "Monomolecular layer of squarylium dye J aggregates exhibiting a femtosecond optical response of delocalized excitons," Applied Physics Letters, vol. 72, No. 21, May 25, 1998.
Furuki et. al., "Observation of sub–100–fs optical response from spin–coated films of squarylium dye J aggregates," Applied Physics Letters, vol. 78, No. 18, Apr. 30, 2001.
Nikkan Kogyo Shimbun, pp. 5, Jul. 13, 1998.

\* cited by examiner

*Primary Examiner*—Brian Healy
*Assistant Examiner*—Derek L. Dupuis
(74) *Attorney, Agent, or Firm*—Oliff & Berridge, PLC

(57) ABSTRACT

A dye thin film containing a dye compound represented by the general formula (I), an optical switch, an optical distributor, an optical modulator and an optical switch array having the dye thin film, as well as a method for producing a dye thin film are provided. The method includes the step of coating the solution of the dye compound on a substrate:

General formula (I)

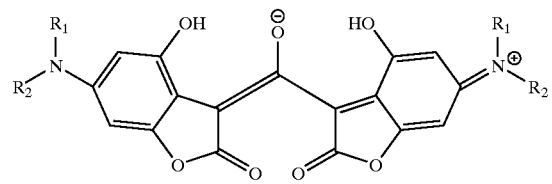

where $R_1$ and $R_2$ may be identical or different from each other and each represents, respectively, a linear alkyl group or a branched alkyl group, the dye thin film having high thermal stability, having intense absorption at approximately 1.3 μm and having ultrafast response characteristic.

14 Claims, 5 Drawing Sheets

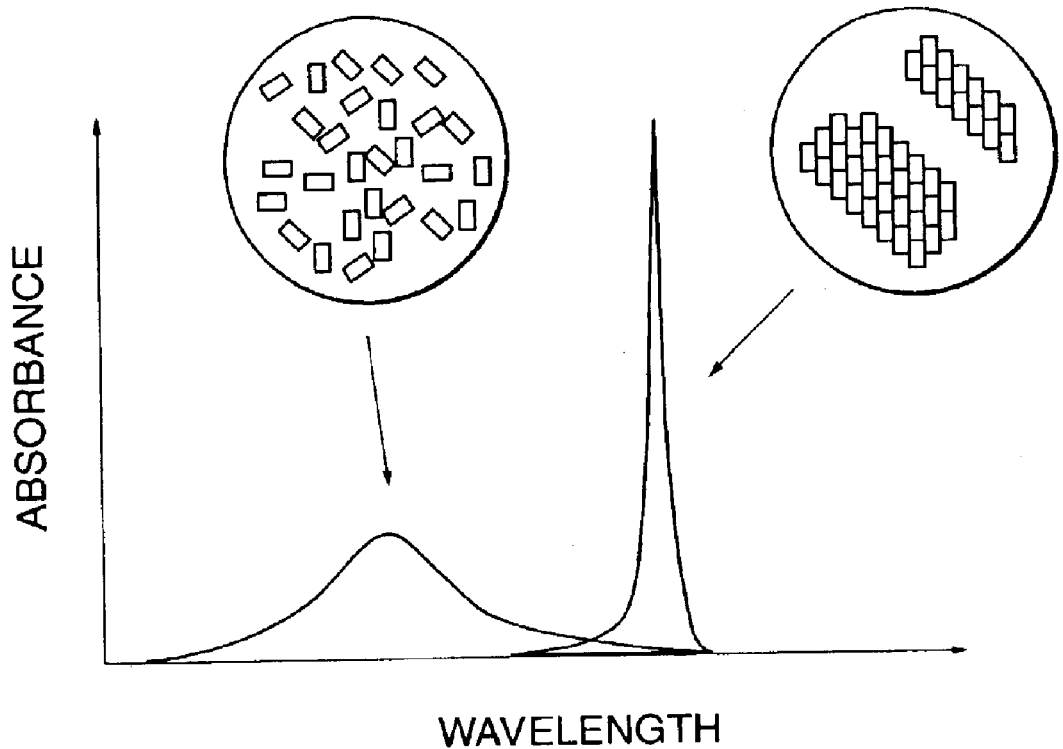

DYE THIN FILM, PRODUCTION METHOD THEREOF, OPTICAL SWITCH, OPTICAL DISTRIBUTOR, OPTICAL MODULATOR AND OPTICAL SWITCH ARRAY

BACKGROUND OF THE INVENTION

1. Field of the Invention

This invention relates to a dye thin film including a novel compound useful, for example, in optical switching and a production method thereof, as well as an optical switch, an optical distributor, an optical modulator and an optical switch array formed by use of the thin film described above.

2. Description of the Related Art

It has been known that some dye derivatives, particularly, cyanine, porphyrin and squarylium dye derivatives form an aggregate. The aggregate means the body in which several tens to several hundreds of molecules are regularly arranged and bonded loosely and behave optically as if they were a single super molecule. Particularly, the one shown in FIG. 5 having an absorption band FIG. 5B which is shifted toward a longer wavelength side and sharpened as compared with an absorption band FIG. 5A of a single molecule is referred to as J-aggregate.

It has been reported that the J-aggregate emits fluorescence with small Stokes shift, has extremely large interaction with light of a wavelength near the absorption peak and shows extremely rapid recovery from absorption saturation as a third-order nonlinear optical effect (M. Furuki, L. S. Pu, F. Sasaki, S. Kobayashi and T. Tani, Appl. Phys. Lett., 72, 21 (1998) 2648). Further, it has been confirmed that the optical response time of a thin film of squarylium dye aggregates formed on a solid substrate is 300 fs (1 fs=$10^{-15}$ second) or less (Page 1 of Nikkan Kogyo Shimbun, dated Jul. 13, 1998). Further, a thin film of aggregates of a squarylium dye derivative having an ultrafast response characteristic of less than 100 fs which can be driven at an energy as low as 80 fJ/$\mu m^2$ has been attained (Page 5 of Nikkei Sangyo Shimbun, dated Jul. 8, 1999; M. Furuki, M Tian, Y, Sato, L. S. Pu, H. Kawashima, S. Tatsuura and O. Wada, Appl. Phys. Lett., 78, 18(2001) 2634). With the feature described above, it is considered that a thin film of aggregates of a squarylium derivative can be used as an optical switch in optical information communication of terabit ($10^{12}$ bit/s) order.

The present inventors have confirmed that the squarylium dye derivative forms aggregates on a solid substrate and they exhibit an ultrafast optical response characteristic of femtosecond order, for which patent applications were already filed (Japanese Published Unexamined Patent Application No. Hei 11-282034 and Japanese Published Unexamined Patent Application No. 2000-111967). However, since the ultrafast optical response of such a dye aggregate film can be obtained only for light of a wavelength near the absorption peak of the aggregates (780 nm), it is difficult at present to apply the film to optical switches that operate at a wavelength exceeding 1 $\mu$m. Since the wavelength of the signal light in actual optical fiber communication networks is 1.3 $\mu$m or 1.55 $\mu$m, it is essential for the optical switch applicable to a communication system to use a dye having an intense absorption at a wavelength exceeding 1 $\mu$m. On the other hand, there have so far been several kinds of near-infrared-absorbing dyes having maximum absorption wavelengths of 1 $\mu$m or more (J. Fabian, H. Nakazumi, M. Matsuoka., Chem. Rev, 92 (1992) 1197).

However, the long-wavelength-absorbing dyes have a feature that the dye molecule includes a large π-conjugated system, and have the following problems:

1) The molar absorption coefficient of the dye is small.
2) The thermal stability is poor since the π-conjugated system is excessively long.
3) The solubility in organic solvents is poor, making it difficult to form a film.

Accordingly, the existent long-wavelength-absorbing dyes are difficult to apply to optical switches. In order to solve this subject, it is necessary to make improvements such as an increase of the solubility of the long-wavelength-absorbing dye, improvement of the thermal stability and sublimation property of the dye and control for the aggregation of the dye molecules in the film.

For the reasons described above, there has been a demand for a dye thin film that contains a near-infrared-absorbing dye having a maximum absorption wavelength of over 1 $\mu$m and having high thermal stability and good solubility, exhibits intense absorption at a wavelength exceeding 1 $\mu$m and has an ultrafast optical response characteristic.

SUMMARY OF THE INVENTION

This invention has been accomplished for the demands as described above and it intends to provide a dye thin film having high thermal stability, and intense absorption at a wavelength exceeding 1 $\mu$m, particularly, around 1.3 $\mu$m, and having an ultrafast optical response characteristics, and a production method thereof, as well as an optical switch, an optical distributor, an optical modulator and an optical switch array formed by use of the dye thin film.

The present inventors have made earnest studies for attaining the foregoing goal and, as a result, have found that for a novel dye compound having a maximum absorption wavelength of over 1 $\mu$m and having high thermal stability, good solubility in organic solvents and excellent film-formation property, a dye thin film with excellent thermal stability can be formed easily by coating its solution on a substrate, and such a dye film has an intense absorption near 1.3 $\mu$m which is longer than 1.09 $\mu$m as the maximum absorption wavelength of single molecules of the dye compound. Further, the inventors have confirmed that the dye thin film can be used as a material for an ultrafast optical switch, an optical distributor, an optical modulator and an optical switch array by utilizing an extremely small recovery time constant for the absorption saturation caused by light of a wavelength near 1.3 $\mu$m, which is the maximum absorption wavelength of the dye thin film thus formed (ultrafast (femtosecond region) optical response characteristic caused by light of a wavelength in the communication wavelength band), and have accomplished this invention.

That is, this invention relates to a dye thin film containing a novel dye compound represented by the following general formula (I), a production method for the dye thin film, an optical switch, an optical distributor, an optical modulator and an optical switch array using the dye thin film described above:

General formula (I)

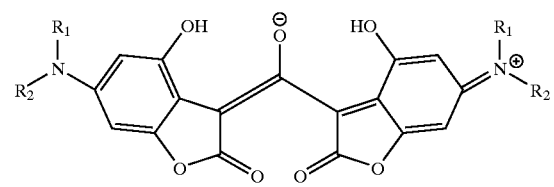

where $R_1$ and $R_2$ may be identical or different from each other and each represents, respectively, a linear alkyl group or a branched alkyl group.

In the general formula (I), $R_1$ and $R_2$ may be identical or different from each other and preferably, each represents a linear alkyl group of 1 to 7 carbon atoms or a branched alkyl group of 3 to 7 carbon atoms, respectively, the isobutyl group being particularly preferred.

BRIEF DESCRIPTION OF THE DRAWINGS

Preferred embodiments of the present invention will be described in details based on the followings, wherein:

FIG. 5A is a graph showing absorption spectrum of the dye molecules that are randomly dispersed and 5B is a graph showing absorption spectrum of the dye molecules that form an aggregate.

PREFERRED EMBODIMENT OF THE INVENTION

Figure 1:
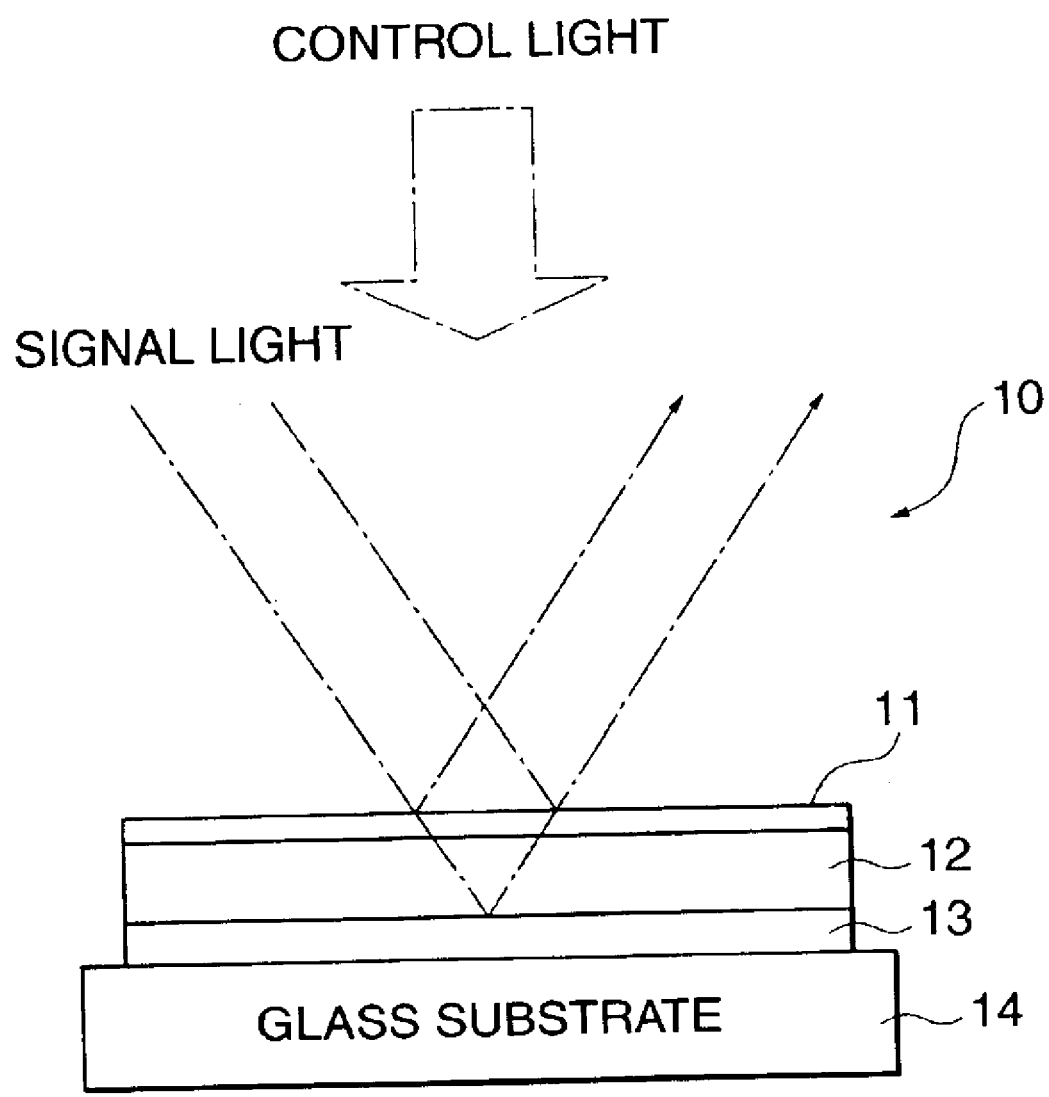
FIG. 1 is a schematic view showing a cross sectional structure of one example of an optical switch.

This invention is to be described specifically.

The dye thin film according to this invention contains a novel near-infrared-absorbing dye compound that is represented by the following general formula (I) and has a maximum absorption wavelength of over 1 μm and high thermal stability and good solubility.

The novel dye compound according to this invention is represented by the following general formula (I).

General formula (I)

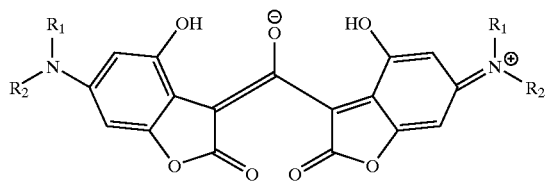

In the general formula (I), $R_1$ and $R_2$ may be identical or different from each other and each represents, respectively, a linear or branched alkyl group, with the linear alkyl group of 1 to 7 carbon atoms or a branched alkyl group of 3 to 7 carbon groups being preferred. Specifically, methyl group, ethyl group, n-propyl group, n-butyl group, isopropyl group, isobutyl group, sec-butyl group or tert-butyl group are more preferred, with n-propyl group, n-butyl group, isopropyl group, isobutyl group or sec-butyl group being particularly preferred.

The compound shows maximum absorption near 1.1 μm and the absorption wavelength thereof can be made greatly longer without excessive extension of the conjugation system as in the existent long wavelength absorption dyes. Further, it has high thermal stability, good solubility in organic solvents such as acetone and chloroform and also has a good film-formation property. Further, it is also excellent in view of the sublimation property. The reason for these phenomena is thought to be that the central difuranonylium methanolate part, which is a skeleton of the compound shown by the general formula (I), has a much better acceptor property compared with squaric acid or croconic acid known so far. By utilizing this basic skeleton structure, a dye molecule having absorption in an extremely long wavelength region can be obtained with a relatively short conjugation system and, accordingly, it is considered that the dye molecule is excellent in long wavelength absorbability, thermal stability, solubility, film-formation property and sublimation property compared with the existent near-infrared-absorbing dyes. The thermal stability means such an extent of thermal stability that the dye molecule can be used effectively as an optical switch (thermal decomposition temperature of 200° C. or higher) and the sublimation property means a sublimation ability that the dye molecule can form a vapor deposition film in a vacuum of $(1-5) \times 10^{-4}$ Pa.

For the absorption characteristic, absorption spectra were measured by using a near infrared photospectrometer. Further, for the thermal stability, the thermal decomposition temperature was measured by thermogravimetry and differential thermal analysis. Further, the solubility in organic solvents such as chloroform or acetone was confirmed.

Based on the excellent solubility and the film-formation property of the dye compound, the dye thin film according to this invention can be formed easily by coating the solution of the dye compound on a substrate.

Further, the dye compound according to this invention can take the structure as shown by the following structural formula.

The dye compound shown by this structural formula has the same characteristic as the characteristic of the compound having the structural formula shown by the general formula (I).

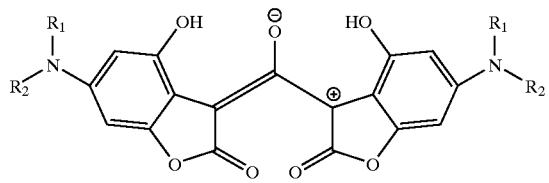

The novel compound described above can be obtained by a production method including the step of reacting the aniline derivative represented by the following general formula (II) with 4,5-dihydroxy-4-cyclopentene-1,2,3-trione represented by the following general formula (III):

General formula (II)

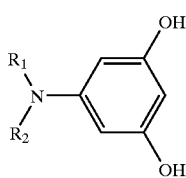

General formula (III)

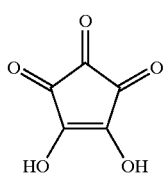

In the general formula (II), $R_1$ and $R_2$ may be identical or different from each other and each represents, respectively, a linear alkyl group or a branched alkyl group.

The aniline derivative of the general formula (II) and 4,5-dihydroxy-cyclopentene-1,2,3-trione represented by the general formula (III) are preferably reacted in a solvent under the condition of azeotropic reflux and it is further preferred to react them together with a dehydrating agent in a solvent under the condition of azeotropic reflux. The obtained compound can be further purified after washing by flash column chromatography and recrystallization.

In the production method of this invention, the molar ratio of the aniline derivative to 4,5-dihydroxy-cyclopentene-1,2,3-trione (mol number of aniline derivative/mol number of 4,5-dihydroxy-cyclopentene-1,2,3-trione) is preferably from 100 to 300% and more preferably, 150 to 250%.

When the molar ratio of the aniline derivative is less than 100%, the novel compound is less formed, whereas when the ratio exceeds 300%, by-products increase and it is difficult to separate and purify the target compound.

There is no particular restriction on the reaction solvent for the production method, and alcohols such as 1-propanol, 1-butanol and 1-pentanol, aromatic hydrocarbons such as benzene, toluene, xylene and monochlorobenzene, ethers such as tetrahydrofuran and dioxane, halogenated hydrocarbons such as chloroform, dichloroethane, trichloroethane, and dichloropropane, and amides such as N,N-dimethylformamide and N,N-dimethylacetamide can be used. The alcohol solvent may be used alone but solvents such as aromatic hydrocarbons, ethers, halogenated hydrocarbons or amides are preferably used after mixed with 1% by volume or more of an alcohol solvent. Among them, 1-propanol, 2-propanol, 1-butanol, 2-butanol, a mixed solvent of 1-propanol and benzene, a mixed solvent of 1-propanol and toluene, a mixed solvent of 1-propanol and N,N-dimethylformamide, a mixed solvent of 2-propanol and benzene, a mixed solvent of 2-propanol and toluene, a mixed solvent of 2-propanol and N,N-dimethylformamide, a mixed solvent of 1-butanol and benzene, a mixed solvent of 1-butanol and toluene, a mixed solvent of 1-butanol and N,N-dimethylformamide, a mixed solvent of 2-butanol and benzene, a mixed solvent of 2-butanol and toluene and a mixed solvent of 2-butanol and N,N-dimethylformamide are preferred. When the mixed solvent is used, the concentration of the alcohol solvent is preferably 1% by volume or more and, more preferably, 5 to 75% by volume.

While a production method may be conducted without using the dehydrating agent, use of the dehydrating agent can provide merits such as shortening of the reaction time and improvement in the yield. There is no particular restriction on the dehydrating agent so long as it does not react with the compounds represented by the general formula (II) and the general formula (III). Orthoformate esters such as trimethyl orthoformate, triethyl orthoformate, tripropyl orthoformate, tributyl orthoformate, and molecular sieves can be used.

The temperature of the reaction solution in the production method is 60° C. or higher and, particularly, preferably, 75° C. or higher. Actually, when the mixed solvent of 1-butanol and toluene is used as a reaction solvent, the temperature of the reaction solution is preferably from 75 to 105° C.

The reaction time for the production method varies depending on the temperature of the reaction solution in the production method in which the reaction time is shorter as the temperature of the reaction solution is higher while the reaction time is longer as the temperature of the reaction solution is lower. Specifically, when the mixed solvent of 1-butanol and toluene is used as the reaction solvent and the reaction solution is reacted at 90 to 105° C., the reaction time is preferably from 5 to 30 minutes.

The reaction described above is conducted preferably in an atmosphere of nitrogen gas.

Concrete examples of the novel dye compounds used in this invention are shown below.

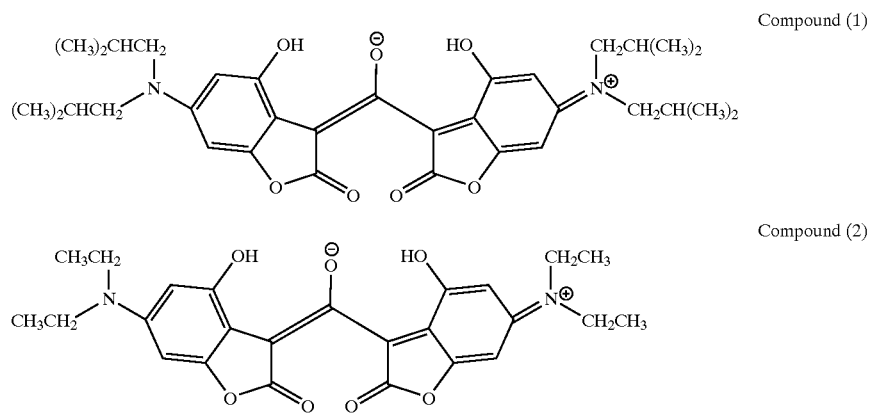

Compound (1)

Compound (2)

[Dye Thin Film]

The dye thin film according to this invention can be formed easily by coating a solution of the dye compound in an organic solvent on a substrate.

There is no particular restriction on the solvent for dissolving the dye compound, and halogenated hydrocarbons such as dichloromethane, chloroform, dichloroethane, trichloroethane and dichloropropane, aromatic hydrocarbons such as benzene, toluene, xylene and monochlorobenzene, alcohols such as methanol, ethanol and 2-propanol, ketones such as cyclohexanone and methylethyl ketone, ethers such as tetrahydrofuran and dioxane, esters such as methyl acetate and ethyl acetate, amides such as N,N-dimethylformamide and N,N-dimethylacetamide and amines such as propyl amine and diethyl amine can be used. Among them, halogenated hydrocarbons and alcohols, specifically, chloroform, dichloroethane, dichloropropane, monochlorobenzene and 2-propanol are preferred and, dichloroethane and dichloropropane are particularly preferred.

Further, the concentration of the dye compound in the solution is preferably from 0.1 to 5 mass % and, more preferably, from 0.3 to 4 mass %. When the concentration is within such a range, an aggregate of good quality can be formed.

As a method of coating the resultant solution on a solid substrate, methods known so far can be used and they can include, for example, a bar-coating method, a spin-coating method, a cast-coating method and a dip-coating method.

The thickness of the dye thin film varies depending on the application and it is generally about from 50 to 500 nm.

The dye thin film formed by coating the solution of the dye compound on the substrate forms an aggregate similar to the J-aggregate, that is, an aggregate of which the absorption band is shifted toward the longer wavelength side compared with the absorption band in the case of single molecules of the dye compound.

Accordingly, while the dye thin film of this invention can be used as it is, it is preferred to further promote the formation of the aggregate by applying a heat treatment to the dye thin film. Promotion of formation of the aggregate can further shift the absorption band toward the long wavelength side.

The temperature in the heat treatment is preferably from 60 to 140° C. When the treatment temperature is lower than 60° C., no sufficient effect by the heat treatment can be obtained. On the other hand, when the temperature exceeds 140° C., the dye will be decomposed remarkably. The treating time is generally from 5 seconds to 60 minutes, and varies depending on the treatment temperature. As the treatment temperature becomes higher, the treatment time is shorter. For example, in the case of applying the heat treatment at 60° C. to the dye thin film, the treatment time is preferably about 60 minutes while the treatment time is preferably about 1 minute in the case of 140° C.

Figure 3:
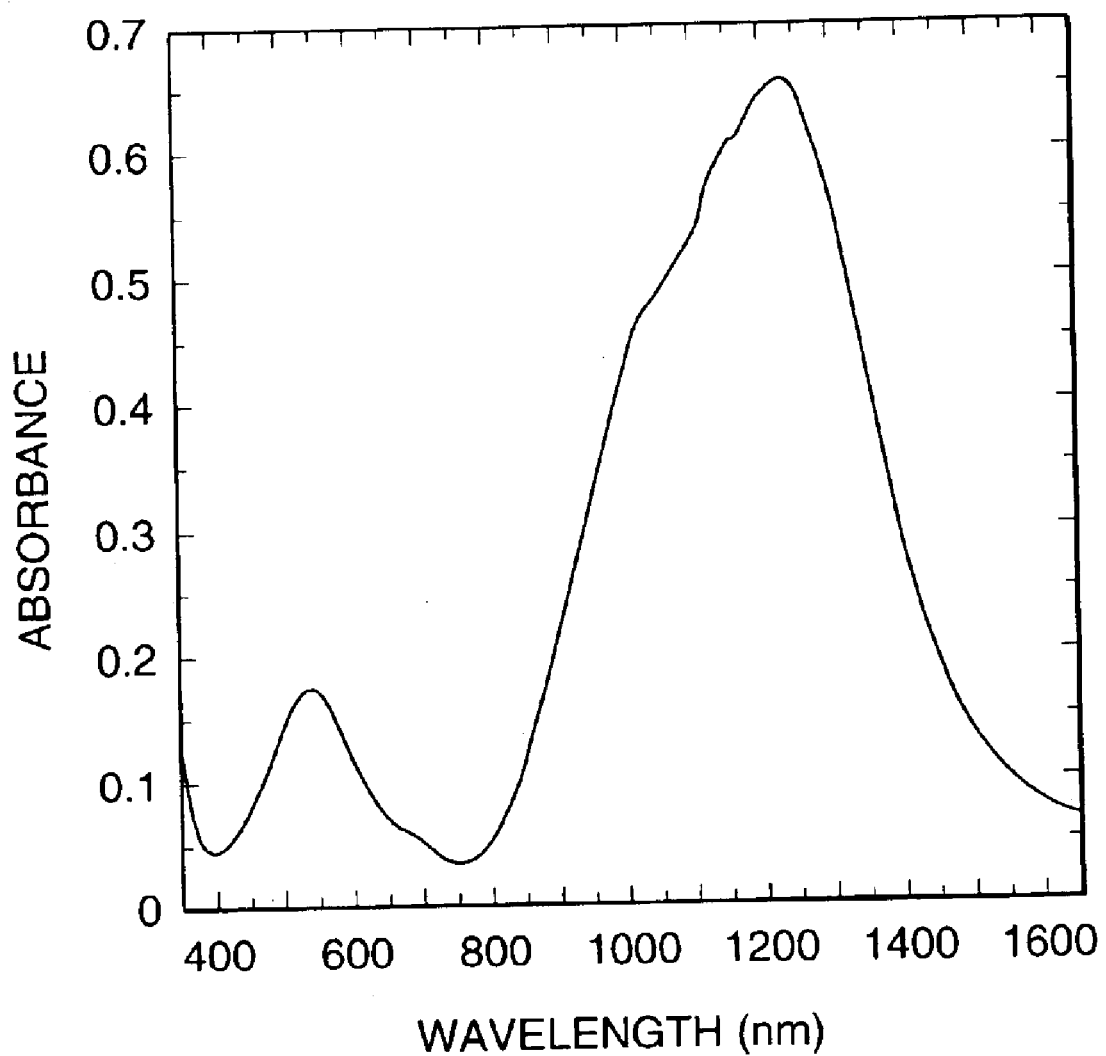
FIG. 3 is a graph showing absorption spectrum of a dye thin film of Example 1.

As a result of measuring the absorption characteristic of the dye thin film according to this invention, it has been confirmed that the dye film has strong absorption intensity near 1.3 $\mu$m (refer to FIG. 3). Further, it has been confirmed that the recovery time constant of absorption saturation caused by light of a wavelength near 1.3 $\mu$m, which is the maximum absorption wavelength of the dye thin film, is extremely small (femtosecond region). This shows that the dye thin film according to this invention has an ultrafast optical response characteristic caused by light of a wavelength in the communication wavelength band. Further, since the dye thin film according to this invention uses a dye compound of a shorter $\pi$-conjugation system compared with existent films using polymethine dyes, it has sufficient thermal stability required for optical switches.

Accordingly, the dye thin film according to this invention is extremely promising as the material for ultrafast optical switches in a femtosecond ($10^{-15}$ seconds) region, or powerful and stable ultrafast optical switches for terabit-grade optical information communication. Further, the dye thin film according to this invention can be used also as a material for optical distributors, optical modulators and optical switch arrays.

[Optical Switch]

The optical switch formed by use of the dye thin film according to this invention has shorter response time compared with optical switches formed with semiconductors, as well as the following advantages:

(1) Since the material is inexpensive and the production process is simple and convenient, it is excellent in productivity.
(2) Both the production and operation of the optical switch can be conducted at room temperature in atmospheric air.
(3) The area can be increased easily. Specifically, an optical switch of a large area (several cm to several tens cm in diameter), which was impossible or extremely difficult to fabricate with a semiconductor material, can be formed easily.
(4) Improvement of the function can be easily made by utilizing various molecules, and hybridization with other kinds of materials is easy since high temperature is not required for film formation.

Then, an optical switch using a dye thin film according to this invention is to be explained with reference to FIG. 1. FIG. 1 is a schematic structural cross sectional view of an optical switch 10 formed by use of a dye thin film according to this invention. As shown in FIG. 1, the optical switch 10 includes a glass substrate 14 (for example, 1,000 $\mu$m in thickness), a dielectric multi-layered film reflection mirror 13 ($SiO_2$, $TiO_2$ or $Al_2O_3$), a dye thin film 12 of the invention (for example, 100 to 300 nm in film thickness) and an Au thin film 11 (50 nm) in this order.

The optical switch utilizes a so-called absorption saturation phenomenon. When a beam of signal light of a wavelength near the maximum absorption wavelength of the dye thin film is incident to the dye thin film 12, the signal light is absorbed by the dye thin film without transmission or reflection to result in a signal-off state. On the other hand, when a beam of control light having a wavelength near the maximum absorption wavelength of the dye thin film and having an intensity larger than that of the signal light is incident to the dye thin film 12, the dye molecules are excited not to absorb the light of a wavelength near the maximum absorption wavelength and, as a result, the signal light is transmitted or reflected to result in a signal-on state. Further, the recovery time of absorption saturation is extremely short and switching with a response time of femtosecond order is possible.

That is, the optical switch 10 can be switched on and off by applying both the control light of a wavelength near the maximum absorption wavelength of the dye thin film 12 and the signal light of a wavelength near the maximum absorption wavelength of the dye thin film 12.

When a beam of signal light (1310 nm, 500 nJ/cm$^2$) with pulse duration of 100 fs and a beam of control light (1310 nm, 600 $\mu$J/cm$^2$) having a pulse duration of 100 fs were used, reflection of the signal light was observed only upon irradiation of the control light and the optical switching operation was confirmed. The response time constant of the optical switch was about 110 fs. In the optical switch 10, the dye thin film according to this invention is preferably formed over the area of 1 mm² or more, particularly, 1 cm² or more. The structure, the constituent elements and the constituent materials for the optical switch 10 explained above are not particularly restricted in this invention.

[Optical Distributor, Optical Modulator, Optical Switch Array]

Next, the optical distributor, the optical modulator and the optical switch array employing the dye thin film according to this invention are to be explained.

In the optical switch array of this invention, plural dye thin films are disposed being spaced apart from each other. After preparing the dye film as a film of a certain area by the production method for the dye film according to this invention, the film is divided into a row or into a matrix by partially masking the obtained film. Thus, a 1-dimensional or 2-dimensional optical switch array can be formed extremely easily. The optical switch array is extremely promising for the applicationssuch as parallel optical information processing.

In this invention, the optical modulator includes all devices such as optical channel conversion element, lens, mirror, directional coupler, as well as those that modulate signal light by the change of the refractive index induced by the control light. Further, there is no particular restriction on the cause for the change of the refractive index and all the nonlinear optical effects shown by the dye thin film can be utilized in addition to the recovery phenomenon of the absorption saturation. Further, in this invention, the optical distributor can be produced by combining the optical switches of this invention.

Figure 2:
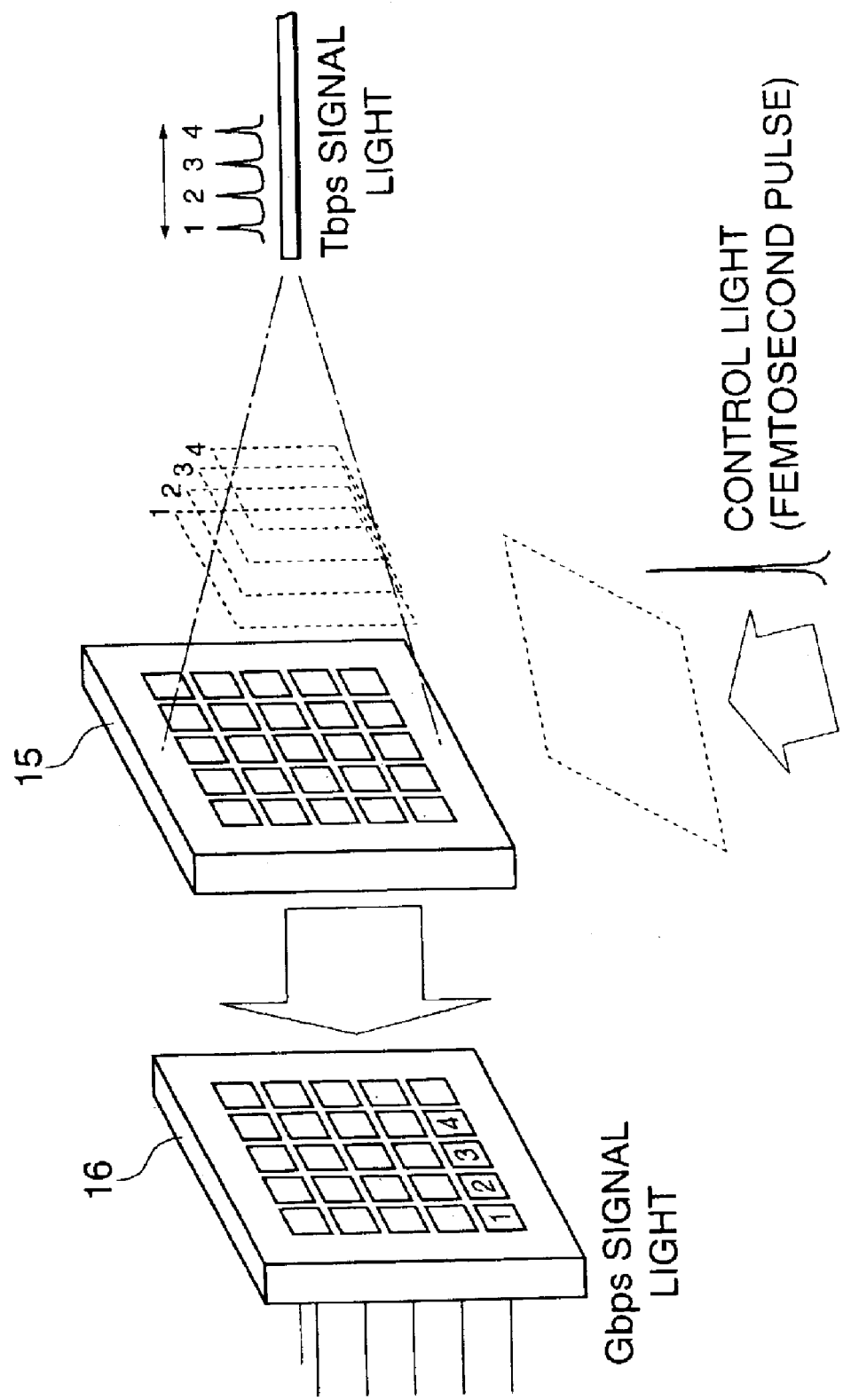
FIG. 2 is a schematic view for explaining an ultrafast spatial modulation device forming an optical switch array which functions also as an optical distributor and an optical modulator.

FIG. 2 shows an ultrafast spatial modulation device 15 forming an optical switch array which functions also as an optical distributor and an optical modulator (DUMUX).

The ultrafast spatial optical modulation device 15 is formed of an optical switch array in which individual optical switches as shown in FIG. 1 are assembled. The optical switch array can be fabricated easily by forming the dye thin film over the entire surface of a substrate, followed by forming a mask thereon and exposing the dye aggregate thin film that is divided, for example, in one row or in a matrix.

The operation principle of the ultrafast spatial modulation device 15 is to be explained. Pulses of signal light with sufficiently diverged wavefront 1,2,3 and 4 are incident vertically to the entire surface of the ultrafast spatial modulation device 15. On the other hand, a beam of control light also with diverged wavefront is incident to the ultrafast spatial modulation device 15 along an inclined direction. Since the optical path length of control light reaching each optical switch is different, only one optical switch in the optical switch array of the ultrafast spatial optical modulation device 15 can be operated. That is, the optical switch irradiated with both the control light and the signal light permit the signal light to transmit. Then, the transmitted signal light reaches a light sensing element array 16 corresponding to the position of the operated optical switch. In this case, the control light modulates the intensity of the signal light. That is, the terabit signal lights 1 to 4 are converted into gigabit signal lights. Accordingly, the ultrafast spatial modulation device 15 functions as an optical modulator. Further, when the signal light and the control light are synchronized so that the intersection position between the signal light and the control light corresponds to each of the optical switches, it is possible to allocate serially sent signal lights to each of the light sensing devices. That is, the ultrafast spatial modulation device 15 functions also as an optical distributor.

EXAMPLE

This invention is to be explained more concretely with reference to the following examples but the invention is not restricted only to these examples.

Reference Example 1 (Production of Compound (1))

3.325 g (14.0 mmol) of 3,5-dihydroxy-N,N-diisobutylaniline and 995 mg (7.0 mmol) of 4,5-dihydroxy-4-cyclopentene-1,2,3-trione were added to a mixed solution of 45 ml of 1-butanol and 135 ml of toluene, and the reaction solution was heated to 95° C. while stirring in a nitrogen gas atmosphere and reacted at 95 to 105° C. for 15 minutes. Water formed by the reaction was removed by azeotropic distillation. After the reaction was completed, toluene and 1-butanol were removed by vacuum distillation, and 150 ml of hexane was added to the resulting mixture. After cooling, the precipitated solids were filtered and washed with hexane, to give a brown-purple solid.

From the solid, a purple fraction was fractionated by flash column chromatography (filler: neutral silica gel; developing solvent: dichloroethane and a mixed solvent of dichloroethane and methanol (volume ratio: 100:1)), to give a black-purple solid. The black purple solid was purified by recrystallization successively from methanol, a mixed solvent of acetone and hexane and a mixed solvent of acetone and methanol, and then dried to give the target compound (1) (a compound of the general formula (I) in which $R_1$ and $R_2$ are isobutyl groups)(black-purple needle microcrystals), 301 mg (yield 7.4%).

Visible-near-infrared absorption spectrum of the target compound (1):

$\lambda_{max}$=1093.2 nm (in dichloroethane solution)

$\epsilon_{max}$=7.87×10⁴ M⁻¹ cm⁻¹ (in dichloroethane solution)

As a result of calculation based on the visible-near-infrared absorption spectrum, the absorption oscillator strength f for the absorption band at 1.1 μm of compound (1) was 0.623, the solubility in chloroform was 54 mg/ml and the decomposition temperature was 202.7° C.

Example 1 (Dye Thin Film)

The dye compound of this invention synthesized in Reference Example 1 ($R_1$ and $R_2$: isobutyl groups in the general formula (I)) was dissolved in dichloroethane to give a solution containing 1 mass % of the dye compound in dichloroethane. Then, the solution was coated by the spin-coating method on a solid substrate to give a dye thin film.

FIG. 3 shows the absorption spectrum of the obtained dye thin film. The absorption peak appearing around 1228 nm is attributable to the aggregate. Since the absorption peak of the dye compound in the solution state is 1093 nm, it can be seen that the absorption band stemming from the aggregate of this example is made longer by 135 nm or more than the absorption band attributable to the single molecules.

Example 2

To demonstrate the possibility of the application of the dye thin film according to this invention to an ultrafast optical switch, the recovery time constant of the absorption saturation was measured and examined.

The dye thin film obtained in Example 1 was measured by the pump/proper method. A beam of probe light (signal light) having a wavelength of 1310 nm, a light intensity of 500 nJ/cm$^2$·pulse, a pulse duration of 100 fs, and a pulse interval of 10 ns was used and a beam of pump light (control light) having a wavelength of 1310 nm, a light intensity of 600 μJ/cm$^2$·pulse, a pulse duration of 100 fs and a pulse interval of 10 ns was applied to measure the amount of change for the absorbance of the dye thin film.

Figure 4:
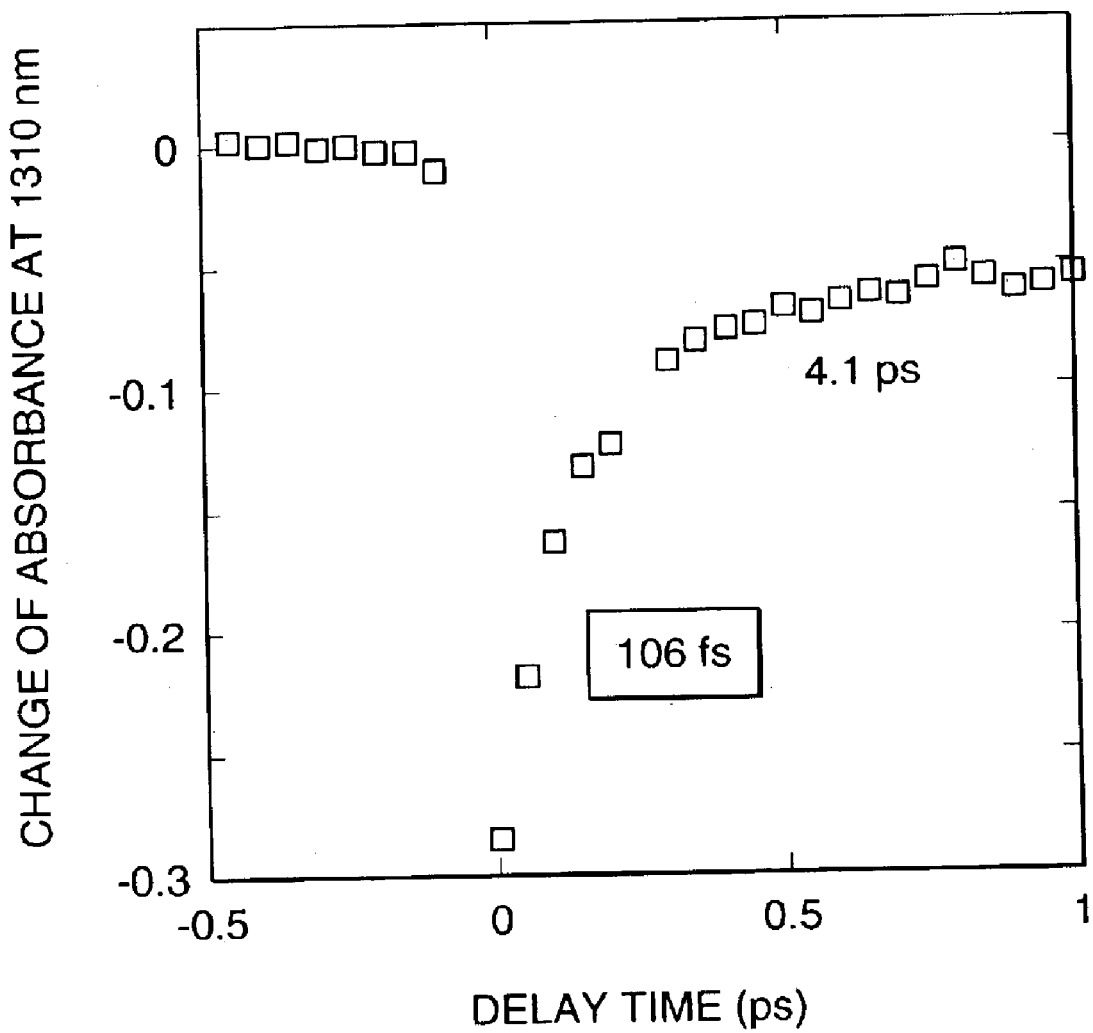
FIG. 4 is a graph showing changes over time for the absorption recovery when the dye thin film of Example 1 is irradiated with a beam of signal light and a beam of control light.

FIG. 4 shows the result of fitting changes over time for the measured amount of change of the absorbance by a model function. It has been found that the optical response of the dye thin film in Example 1 contains 65 to 75% of a rapid component with the recovery time constant of absorption saturation of about 106 fs, and 35 to 25% of a slow component with the recovery time constant of absorption saturation of about 4 ps. Accordingly, it can be seen that the dye thin film according to this invention represented by the dye thin film of Example 1 can be applied to an ultrafast optical switch which can be operated at 1 THz or higher.

The dye thin film according to this invention has an intense absorption at approximately 1.3 μm and has an extremely short recovery time constant of absorption saturation induced by light of a wavelength near 1.3 μm. That is, it has an ultrafast (femtosecond region) optical response characteristic caused by light of a wavelength in the communication wavelength band. Accordingly, the optical switch, the optical distributor, the optical modulator and the optical switch array having the dye thin film exhibit ultrafast responsiveness caused by the light of a wavelength in the communication wavelength band. Further, since the dye thin film according to this invention is excellent also in the thermal stability, it is excellent in the stability and the repeating frequency of the switch operation when used, for example, in the above-mentioned optical switch.

The entire disclosure of Japanese Patent Application No. 2002-125772 filed on Apr. 26, 2002 including specification, claims, drawings and abstract is incorporated herein by reference in its entirety.

What are claimed are:

1. A dye thin film comprising a dye compound represented by the general formula (I) below:

General formula (I)

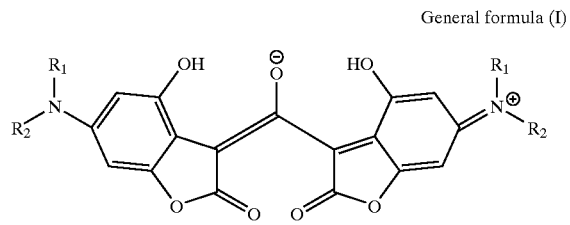

where $R_1$ and $R_2$ may be identical or different from each other and each represents a linear alkyl group or a branched alkyl group.

2. The dye thin film according to claim 1, wherein $R_1$ and $R_2$ in the general formula (I) may be identical or different from each other and each represents a linear alkyl group of 1 to 7 carbon atoms or a branched alkyl group of 3 to 7 carbon atoms.

3. The dye thin film according to claim 1, wherein the molecules of the dye compound represented by the general formula (I) form an aggregate.

4. The dye thin film according to claim 3, wherein the absorption band of the aggregate is shifted toward a longer wavelength side compared with the absorption band of single molecules.

5. A method for producing a dye thin film defined in claim 1, comprising the steps of:

dissolving a dye compound represented by the general formula (I) into a solvent; and coating a substrate with a resultant solution.

6. The production method for a dye thin film according to claim 5, wherein the solvent is a halogenated hydrocarbon or an alcohol.

7. The production method for a dye thin film according to claim 5, wherein the concentration of the dye compound represented by the general formula (I) is from 0.1 to 5 mass %.

8. The production method for a dye thin film according to claim 5, wherein the coating method is any of a bar-coating method, a spin-coating method, a cast-coating method and a dip-coating method.

9. An optical switch having a dye thin film defined in claim 1.

10. The optical switch according to claim 9, wherein the dye thin film forms an aggregate and the area thereof is 1 mm$^2$ or larger.

11. The optical switch according to claim 9, wherein the dye thin film forms an aggregate and the area thereof is 1 cm$^2$ or larger.

12. An optical distributor having a dye thin film defined in claim 1.

13. An optical modulator having a dye thin film defined in claim 1.

14. An optical switch array in which plural dye thin films defined in claim 1 are disposed being spaced apart from each other.

* * * * *